(12) United States Patent
Aaltonen et al.

(10) Patent No.: US 8,712,382 B2
(45) Date of Patent: Apr. 29, 2014

(54) METHOD AND DEVICE FOR MANAGING SUBSCRIBER CONNECTION

(75) Inventors: Janne Aaltonen, Turku (FI); Timo Ahopelto, Helsinki (FI); Timo Romppanen, Helsinki (FI)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 12/446,710

(22) PCT Filed: Oct. 27, 2006

(86) PCT No.: PCT/FI2006/050466
§ 371 (c)(1),
(2), (4) Date: Apr. 22, 2009

(87) PCT Pub. No.: WO2008/049955
PCT Pub. Date: May 2, 2008

(65) Prior Publication Data
US 2010/0003963 A1 Jan. 7, 2010

(51) Int. Cl.
*H04M 1/725* (2006.01)

(52) U.S. Cl.
USPC ........ 455/412.2; 455/405; 455/406; 455/407; 455/409

(58) Field of Classification Search
USPC .............. 455/550.1, 405, 406, 407, 408, 409, 455/412.2, 414.1, 414.3, 425; 705/14.27, 705/14.28, 14.31, 14.33, 14.34, 14.39, 14.4, 705/14.41, 14.42, 1, 4.43, 14.44, 14.45, 705/14.46, 14.49, 14.52, 14.53, 14.67, 319
See application file for complete search history.

(56) References Cited

U.S. PATENT DOCUMENTS

| | | |
|---|---|---|
| 5,408,519 A | 4/1995 | Pierce et al. |
| 5,459,306 A | 10/1995 | Stein et al. |
| 5,600,364 A | 2/1997 | Hendricks et al. |
| 5,613,213 A | 3/1997 | Naddell et al. |
| 5,678,179 A | 10/1997 | Turcotte et al. |
| 5,978,775 A | 11/1999 | Chen |
| 5,978,833 A | 11/1999 | Pashley et al. |
| 6,006,197 A | 12/1999 | d'Eon et al. |
| 6,009,410 A | 12/1999 | LeMole et al. |
| 6,023,700 A | 2/2000 | Owens et al. |
| 6,055,512 A | 4/2000 | Dean et al. |
| 6,055,513 A | 4/2000 | Katz et al. |

(Continued)

FOREIGN PATENT DOCUMENTS

| | | |
|---|---|---|
| BE | 1015704 | 7/2005 |
| DE | 19941461 | 3/2001 |

(Continued)

OTHER PUBLICATIONS

International Search Report for International Application No. PCT/FI2006/050466, dated Jul. 25, 2007.

(Continued)

*Primary Examiner* — Suhail Khan
(74) *Attorney, Agent, or Firm* — Novak Druce Connolly Bove + Quigg LLP

(57) ABSTRACT

The invention relates to a device for managing a subscriber connection, the device including a mechanism for granting connection services to the subscriber connection, mechanism for monitoring reception behavior concerning predetermined messages conveyed to the subscriber connection, and a mechanism for controlling a further connection service grant to the subscriber connection based on the reception behavior.

14 Claims, 2 Drawing Sheets

(56) References Cited

U.S. PATENT DOCUMENTS

| | | | |
|---|---|---|---|
| 6,057,872 A | 5/2000 | Candelore | |
| 6,097,942 A | 8/2000 | Laiho | |
| 6,253,189 B1 | 6/2001 | Feezell et al. | |
| 6,286,005 B1 | 9/2001 | Cannon | |
| 6,334,145 B1 | 12/2001 | Adams et al. | |
| 6,338,044 B1 | 1/2002 | Cook et al. | |
| 6,345,279 B1 | 2/2002 | Li et al. | |
| 6,381,465 B1 | 4/2002 | Chern et al. | |
| 6,393,407 B1 | 5/2002 | Middleton, III et al. | |
| 6,405,243 B1 | 6/2002 | Nielsen | |
| 6,408,309 B1 | 6/2002 | Agarwal | |
| 6,446,261 B1 | 9/2002 | Rosser | |
| 6,502,076 B1 | 12/2002 | Smith | |
| 6,684,249 B1 | 1/2004 | Frerichs et al. | |
| 6,690,394 B1 | 2/2004 | Harui | |
| 6,698,020 B1 | 2/2004 | Zigmond et al. | |
| 6,718,551 B1 | 4/2004 | Swix et al. | |
| 6,738,978 B1 | 5/2004 | Hendricks et al. | |
| 6,795,808 B1 | 9/2004 | Strubbe et al. | |
| 6,886,000 B1 | 4/2005 | Aggarwal et al. | |
| 6,920,326 B2 | 7/2005 | Agarwal et al. | |
| 6,990,462 B1 | 1/2006 | Wilcox et al. | |
| 7,039,599 B2 | 5/2006 | Merriman et al. | |
| 7,072,947 B1 | 7/2006 | Knox et al. | |
| 7,149,537 B1 | 12/2006 | Kupsh et al. | |
| 7,168,084 B1 | 1/2007 | Hendricks et al. | |
| 7,203,684 B2 | 4/2007 | Carobus et al. | |
| 7,280,818 B2 | 10/2007 | Clayton | |
| 7,356,477 B1 | 4/2008 | Allan et al. | |
| 7,370,002 B2 | 5/2008 | Heckerman et al. | |
| 7,539,652 B2 | 5/2009 | Flinn et al. | |
| 7,558,559 B2 | 7/2009 | Alston | |
| 7,669,212 B2 | 2/2010 | Alao et al. | |
| 7,685,019 B2 | 3/2010 | Collins | |
| 7,730,017 B2 | 6/2010 | Nance et al. | |
| 7,734,632 B2 | 6/2010 | Wang | |
| 7,747,676 B1 | 6/2010 | Nayfeh et al. | |
| 7,870,576 B2 | 1/2011 | Eldering | |
| 7,882,518 B2 | 2/2011 | Finseth et al. | |
| 7,903,099 B2 | 3/2011 | Baluja | |
| 7,912,843 B2 | 3/2011 | Murdock et al. | |
| 7,984,014 B2 | 7/2011 | Song et al. | |
| 8,046,797 B2 | 10/2011 | Bentolila et al. | |
| 8,060,406 B2 | 11/2011 | Blegen | |
| 8,196,166 B2 | 6/2012 | Roberts | |
| 8,229,786 B2 | 7/2012 | Cetin et al. | |
| 8,380,562 B2 | 2/2013 | Toebes et al. | |
| 2001/0044739 A1 | 11/2001 | Bensemana | |
| 2001/0047272 A1 | 11/2001 | Frietas et al. | |
| 2001/0051925 A1 | 12/2001 | Kang | |
| 2002/0006803 A1 | 1/2002 | Mendiola et al. | |
| 2002/0016736 A1 | 2/2002 | Cannon et al. | |
| 2002/0019829 A1 | 2/2002 | Shapiro | |
| 2002/0052781 A1* | 5/2002 | Aufricht et al. | 705/14 |
| 2002/0075305 A1 | 6/2002 | Beaton et al. | |
| 2002/0077130 A1 | 6/2002 | Owensby | |
| 2002/0078147 A1 | 6/2002 | Bouthors et al. | |
| 2002/0083411 A1 | 6/2002 | Bouthors et al. | |
| 2002/0099842 A1 | 7/2002 | Jennings et al. | |
| 2002/0120498 A1 | 8/2002 | Gordon et al. | |
| 2002/0137507 A1 | 9/2002 | Winkler | |
| 2002/0138291 A1 | 9/2002 | Vaidyanathan et al. | |
| 2002/0161770 A1 | 10/2002 | Shapiro et al. | |
| 2002/0164977 A1 | 11/2002 | Link, II et al. | |
| 2002/0165773 A1* | 11/2002 | Natsuno et al. | 705/14 |
| 2002/0175935 A1 | 11/2002 | Wang et al. | |
| 2003/0003935 A1 | 1/2003 | Vesikivi et al. | |
| 2003/0023489 A1 | 1/2003 | McGuire et al. | |
| 2003/0040297 A1 | 2/2003 | Pecen et al. | |
| 2003/0083931 A1 | 5/2003 | Lang | |
| 2003/0101454 A1 | 5/2003 | Ozer et al. | |
| 2003/0126015 A1 | 7/2003 | Chan et al. | |
| 2003/0126146 A1 | 7/2003 | Van Der Riet | |
| 2003/0130887 A1 | 7/2003 | Nathaniel | |
| 2003/0154300 A1 | 8/2003 | Mostafa | |
| 2003/0182567 A1 | 9/2003 | Barton et al. | |
| 2003/0188017 A1 | 10/2003 | Nomura | |
| 2003/0191689 A1 | 10/2003 | Bosarge et al. | |
| 2003/0197719 A1 | 10/2003 | Lincke et al. | |
| 2004/0003398 A1 | 1/2004 | Donian et al. | |
| 2004/0043777 A1 | 3/2004 | Brouwer et al. | |
| 2004/0045029 A1 | 3/2004 | Matsuura | |
| 2004/0054576 A1 | 3/2004 | Kanerva et al. | |
| 2004/0068435 A1 | 4/2004 | Braunzell | |
| 2004/0133480 A1 | 7/2004 | Domes | |
| 2004/0136358 A1 | 7/2004 | Hind et al. | |
| 2004/0158858 A1 | 8/2004 | Paxton et al. | |
| 2004/0185883 A1 | 9/2004 | Rukman | |
| 2004/0192359 A1 | 9/2004 | McRaild et al. | |
| 2004/0203761 A1 | 10/2004 | Baba et al. | |
| 2004/0203851 A1 | 10/2004 | Vetro et al. | |
| 2004/0204133 A1 | 10/2004 | Andrew et al. | |
| 2004/0209649 A1 | 10/2004 | Lord | |
| 2004/0259526 A1 | 12/2004 | Goris et al. | |
| 2005/0010641 A1 | 1/2005 | Staack | |
| 2005/0021397 A1 | 1/2005 | Cui et al. | |
| 2005/0060425 A1 | 3/2005 | Yeh et al. | |
| 2005/0071224 A1 | 3/2005 | Fikes et al. | |
| 2005/0075929 A1 | 4/2005 | Wolinsky et al. | |
| 2005/0125397 A1 | 6/2005 | Gross et al. | |
| 2005/0138140 A1 | 6/2005 | Wen et al. | |
| 2005/0228680 A1 | 10/2005 | Malik | |
| 2005/0228797 A1 | 10/2005 | Koningstein et al. | |
| 2005/0229209 A1 | 10/2005 | Hildebolt et al. | |
| 2005/0239495 A1* | 10/2005 | Bayne | 455/550.1 |
| 2005/0239504 A1 | 10/2005 | Ishii et al. | |
| 2005/0249216 A1 | 11/2005 | Jones | |
| 2005/0267798 A1 | 12/2005 | Panara | |
| 2005/0273465 A1 | 12/2005 | Kimura | |
| 2005/0273833 A1 | 12/2005 | Soinio | |
| 2005/0289113 A1 | 12/2005 | Bookstaff | |
| 2006/0031327 A1 | 2/2006 | Kredo | |
| 2006/0040642 A1 | 2/2006 | Boris et al. | |
| 2006/0048059 A1 | 3/2006 | Etkin | |
| 2006/0059133 A1 | 3/2006 | Moritani | |
| 2006/0068845 A1 | 3/2006 | Muller et al. | |
| 2006/0075425 A1 | 4/2006 | Koch et al. | |
| 2006/0095511 A1 | 5/2006 | Munarriz et al. | |
| 2006/0117378 A1 | 6/2006 | Tam et al. | |
| 2006/0123014 A1 | 6/2006 | Ng | |
| 2006/0129455 A1 | 6/2006 | Shah | |
| 2006/0141923 A1 | 6/2006 | Goss | |
| 2006/0161520 A1 | 7/2006 | Brewer et al. | |
| 2006/0168616 A1 | 7/2006 | Candelore | |
| 2006/0194595 A1 | 8/2006 | Myllynen et al. | |
| 2006/0200460 A1 | 9/2006 | Meyerzon et al. | |
| 2006/0200461 A1 | 9/2006 | Lucas et al. | |
| 2006/0206586 A1 | 9/2006 | Ling et al. | |
| 2006/0276170 A1 | 12/2006 | Radhakrishnan et al. | |
| 2006/0276213 A1 | 12/2006 | Gottschalk et al. | |
| 2006/0282328 A1 | 12/2006 | Gerace et al. | |
| 2006/0286963 A1 | 12/2006 | Koskinen et al. | |
| 2006/0286964 A1 | 12/2006 | Polanski et al. | |
| 2006/0288124 A1 | 12/2006 | Kraft et al. | |
| 2007/0004333 A1 | 1/2007 | Kavanti | |
| 2007/0011344 A1 | 1/2007 | Paka et al. | |
| 2007/0016743 A1 | 1/2007 | Jevans | |
| 2007/0022021 A1 | 1/2007 | Walker et al. | |
| 2007/0027703 A1 | 2/2007 | Hu et al. | |
| 2007/0027760 A1 | 2/2007 | Collins et al. | |
| 2007/0027762 A1 | 2/2007 | Collins et al. | |
| 2007/0037562 A1 | 2/2007 | Smith-Kerker et al. | |
| 2007/0047523 A1 | 3/2007 | Jiang | |
| 2007/0061195 A1 | 3/2007 | Liu et al. | |
| 2007/0061300 A1* | 3/2007 | Ramer et al. | 707/3 |
| 2007/0067215 A1 | 3/2007 | Agarwal et al. | |
| 2007/0072631 A1 | 3/2007 | Mock et al. | |
| 2007/0074262 A1 | 3/2007 | Kikkoji et al. | |
| 2007/0078712 A1 | 4/2007 | Ott et al. | |
| 2007/0083602 A1 | 4/2007 | Heggenhougen et al. | |
| 2007/0088687 A1 | 4/2007 | Bromm et al. | |
| 2007/0088801 A1 | 4/2007 | Levkovitz et al. | |
| 2007/0088851 A1 | 4/2007 | Levkovitz et al. | |
| 2007/0094066 A1 | 4/2007 | Kumar et al. | |

(56) References Cited

U.S. PATENT DOCUMENTS

| | | | |
|---|---|---|---|
| 2007/0100651 A1* | 5/2007 | Ramer et al. | 705/1 |
| 2007/0100805 A1 | 5/2007 | Ramer et al. | |
| 2007/0105536 A1 | 5/2007 | Tingo, Jr. | |
| 2007/0113243 A1 | 5/2007 | Brey | |
| 2007/0117571 A1 | 5/2007 | Musial | |
| 2007/0118592 A1* | 5/2007 | Bachenberg | 709/203 |
| 2007/0136457 A1 | 6/2007 | Dai et al. | |
| 2007/0149208 A1 | 6/2007 | Syrbe et al. | |
| 2007/0180147 A1 | 8/2007 | Leigh | |
| 2007/0192409 A1 | 8/2007 | Kleinstern et al. | |
| 2007/0198485 A1 | 8/2007 | Ramer et al. | |
| 2007/0208619 A1 | 9/2007 | Branam et al. | |
| 2007/0214470 A1 | 9/2007 | Glasgow et al. | |
| 2007/0233671 A1 | 10/2007 | Oztekin et al. | |
| 2007/0260624 A1 | 11/2007 | Chung et al. | |
| 2007/0288950 A1 | 12/2007 | Downey et al. | |
| 2007/0290787 A1 | 12/2007 | Fiatal et al. | |
| 2007/0300263 A1 | 12/2007 | Barton et al. | |
| 2008/0004046 A1 | 1/2008 | Mumick et al. | |
| 2008/0004958 A1 | 1/2008 | Ralph et al. | |
| 2008/0013537 A1 | 1/2008 | Dewey et al. | |
| 2008/0032703 A1 | 2/2008 | Krumm et al. | |
| 2008/0032717 A1 | 2/2008 | Sawada et al. | |
| 2008/0040175 A1 | 2/2008 | Dellovo | |
| 2008/0052158 A1 | 2/2008 | Ferro et al. | |
| 2008/0065491 A1 | 3/2008 | Bakman | |
| 2008/0070579 A1 | 3/2008 | Kankar et al. | |
| 2008/0071875 A1 | 3/2008 | Koff et al. | |
| 2008/0071929 A1 | 3/2008 | Motte et al. | |
| 2008/0082686 A1 | 4/2008 | Schmidt et al. | |
| 2008/0091796 A1 | 4/2008 | Story | |
| 2008/0133344 A1 | 6/2008 | Hyder et al. | |
| 2008/0140508 A1 | 6/2008 | Anand et al. | |
| 2008/0228568 A1 | 9/2008 | Williams et al. | |
| 2008/0243619 A1 | 10/2008 | Sharman et al. | |
| 2008/0249832 A1 | 10/2008 | Richardson et al. | |
| 2008/0262927 A1 | 10/2008 | Kanayama et al. | |
| 2008/0271068 A1 | 10/2008 | Ou et al. | |
| 2008/0281606 A1 | 11/2008 | Kitts et al. | |
| 2008/0288476 A1 | 11/2008 | Kim et al. | |
| 2008/0319836 A1 | 12/2008 | Aaltonen et al. | |
| 2009/0006194 A1 | 1/2009 | Sridharan et al. | |
| 2009/0029721 A1 | 1/2009 | Doraswamy | |
| 2009/0049090 A1 | 2/2009 | Shenfield et al. | |
| 2009/0063249 A1 | 3/2009 | Tomlin et al. | |
| 2009/0106111 A1 | 4/2009 | Walk et al. | |
| 2009/0125377 A1 | 5/2009 | Somji et al. | |
| 2009/0132395 A1 | 5/2009 | Lam et al. | |
| 2009/0138304 A1 | 5/2009 | Aharoni et al. | |
| 2009/0197619 A1 | 8/2009 | Colligan et al. | |
| 2009/0216847 A1 | 8/2009 | Krishnaswamy et al. | |
| 2009/0240677 A1 | 9/2009 | Parekh et al. | |
| 2009/0275315 A1 | 11/2009 | Alston | |
| 2009/0286520 A1 | 11/2009 | Nielsen et al. | |
| 2009/0298483 A1 | 12/2009 | Bratu et al. | |
| 2010/0030647 A1 | 2/2010 | Shahshahani | |
| 2010/0082397 A1 | 4/2010 | Blegen | |
| 2010/0082423 A1 | 4/2010 | Nag et al. | |
| 2010/0088152 A1 | 4/2010 | Bennett | |
| 2010/0114654 A1 | 5/2010 | Lukose et al. | |
| 2010/0125505 A1 | 5/2010 | Puttaswamy | |
| 2010/0138271 A1 | 6/2010 | Henkin | |
| 2010/0153216 A1 | 6/2010 | Liang et al. | |
| 2010/0161424 A1 | 6/2010 | Sylvain | |
| 2010/0169157 A1 | 7/2010 | Muhonen et al. | |
| 2010/0169176 A1 | 7/2010 | Turakhia | |
| 2011/0106840 A1 | 5/2011 | Barrett et al. | |
| 2011/0209067 A1 | 8/2011 | Bogess et al. | |
| 2011/0276401 A1 | 11/2011 | Knowles et al. | |

FOREIGN PATENT DOCUMENTS

| | | |
|---|---|---|
| DE | 10061984 | 6/2002 |
| EP | 1061465 | 12/2000 |
| EP | 1073293 | 1/2001 |
| EP | 1107137 | 6/2001 |
| EP | 1109371 | 6/2001 |
| EP | 1220132 | 7/2002 |
| EP | 1239392 | 9/2002 |
| EP | 1280087 | 1/2003 |
| EP | 1365604 | 11/2003 |
| EP | 1408705 | 4/2004 |
| EP | 14555111 | 9/2004 |
| EP | 1509024 | 2/2005 |
| EP | 1528827 | 5/2005 |
| EP | 1542482 | 6/2005 |
| EP | 1587332 | 10/2005 |
| EP | 1615455 | 1/2006 |
| EP | 1633100 | 3/2006 |
| EP | 1677475 | 7/2006 |
| GB | 2343051 | 4/2000 |
| GB | 2369218 | 5/2002 |
| GB | 2372867 | 9/2002 |
| GB | 2406996 | 4/2005 |
| GB | 2414621 | 11/2005 |
| GB | 2424546 | 9/2006 |
| JP | 2002140272 | 5/2002 |
| JP | 2007087138 | 4/2007 |
| JP | 2007199821 | 8/2007 |
| KR | 20060011760 | 7/2004 |
| WO | 96/24213 | 8/1996 |
| WO | WO 98/21713 | 5/1998 |
| WO | WO 00/00916 | 1/2000 |
| WO | 00/30002 | 5/2000 |
| WO | 00/44151 | 7/2000 |
| WO | 01/22748 | 3/2001 |
| WO | 01/31497 | 5/2001 |
| WO | 01/44977 | 6/2001 |
| WO | 01/52161 | 7/2001 |
| WO | 01/57705 | 8/2001 |
| WO | 01/58178 | 8/2001 |
| WO | 01/63423 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 01/91400 | 11/2001 |
| WO | 01/93551 | 12/2001 |
| WO | 01/97539 | 12/2001 |
| WO | 02/09431 | 1/2002 |
| WO | 02/31624 | 4/2002 |
| WO | 02/44989 | 6/2002 |
| WO | 02/054803 | 7/2002 |
| WO | 02/069585 | 9/2002 |
| WO | 02/069651 | 9/2002 |
| WO | 02/075574 | 9/2002 |
| WO | 02/084895 | 10/2002 |
| WO | 02/086664 | 10/2002 |
| WO | 02/096056 | 11/2002 |
| WO | 03/015430 | 2/2003 |
| WO | 03/019845 | 3/2003 |
| WO | 03/024136 | 3/2003 |
| WO | 03/049461 | 6/2003 |
| WO | 03/088690 | 10/2003 |
| WO | 2004/084532 | 9/2004 |
| WO | 2004/086791 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | 2005/020578 | 3/2005 |
| WO | 2005/029769 | 3/2005 |
| WO | 2005/073863 | 8/2005 |
| WO | 2005/076650 | 8/2005 |
| WO | 2006/002869 | 1/2006 |
| WO | 2006/005001 | 1/2006 |
| WO | 2006/016189 | 2/2006 |
| WO | 2006/024003 | 3/2006 |
| WO | 2006/027407 | 3/2006 |
| WO | 2006/040749 | 4/2006 |
| WO | 2006/093284 | 9/2006 |
| WO | 2006/119481 | 11/2006 |
| WO | 2007/001118 | 1/2007 |

(56) References Cited

FOREIGN PATENT DOCUMENTS

| WO | 2007/002025 | 1/2007 |
|---|---|---|
| WO | 2007/060451 | 5/2007 |
| WO | 1772822 | 5/2007 |
| WO | 2007/091089 | 8/2007 |
| WO | 2007/103263 | 9/2007 |
| WO | 2008/013437 | 1/2008 |
| WO | 2008/024852 | 2/2008 |
| WO | 2008/045867 | 4/2008 |
| WO | 2008/147919 | 12/2008 |
| WO | 2009/009507 | 1/2009 |
| WO | 2009/032856 | 3/2009 |
| WO | 2009/061914 | 5/2009 |
| WO | 2009/077888 | 6/2009 |
| WO | 2009/099876 | 8/2009 |
| WO | 2009/158097 | 12/2009 |

OTHER PUBLICATIONS

"AdWords Reference Guide", Google, 2004.
Ghose, Anindya et al., "An Empirical Analysis of Search Engine Advertising: Sponsored Search in Electronic Markets", Management Science, Informs, 2009.
Karuga, Gilber G. et al., "AdPalette: An Algorithm for Customizing Online Advertisements on the Fly", Decision Support Systems, vol. 32, 2001.
"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010)., Jul. 24, 2006.
"Combined Search and Examination Report", for United Kingdom Patent Application No. GB 0816228.1 dated Jan. 2009, Jan. 6, 2009.
"Combined Search and Examination Report dated Mar. 7, 2008", for United Kingdom Patent Application No. GB 0721863.9, Mar. 7, 2008.
"Communication (Combined Search and Examination Report under Sections 17 and 18(3)) dated Jan. 30, 2009 issued from the United Kingdom Patent Office", in related United Kingdom Application No. GB 0818145.5 (8 pages), Jan. 30, 2009.
"Communication (European Search Report) dated Jun. 26, 2008", in European Patent Application No. EP 08101394, Jun. 26, 2008.
"Communication (European Search Report) dated Oct. 17, 2008 issued by the European Patent Office", in counterpart European Patent Application EP 08156763, Oct. 17, 2008.
"Communication (International Search Report along with Written Opinion of International Searching Authority) mailed Oct. 8, 2008 issued by the International Searching Authority", in counterpart International Application PCT/EP 2008/056342, Oct. 8, 2008.
"Communication (Notification Concerning Transmittal of International Preliminary Report on Patentability, International Preliminary Report on Patentability, and Written Opinion of the International Searching Authority)", issued in connection with related International Application PCT/EP 2008/051489 and mailed on Sep. 24, 2009 (6 pages), Sep. 24, 2009.
"Communication (Search Report under Section 17 along with Examination Report under Section 18(3)) dated Oct. 6, 2008 issued by the United Kingdom Intellectual Property Office", in counterpart U.K. Application GB 0809321.3, Oct. 6, 2008.
"Communication Pursuant to Article 94(3) EPC (European Examination Report) dated Oct. 23, 2008", issued in counterpart European Patent Application No. EP 08101394.8-1238, Oct. 23, 2008.
"Examination Report", for counterpart European Patent Application No. 08153257.4 issued Jun. 2, 2009.
"Examination Report dated Sep. 11, 2009", for European Patent Application No. EP 08159355.0, Sep. 11, 2009.
"Examination Report dated Jun. 17, 2009", issued in counterpart U.K. Application No. GB 0803273.2 by U.K. Intellectual Property Office (4 pages).

"International Preliminary Report on Patentability and Written Opinion issued Nov. 24, 2009", in International Application PCT/EP2008/056342, Nov. 24, 2009.
"International Search Report and Written Opinion mailed on Aug. 26, 2011", for PCT/US 2011/034927 titled "Content Delivery Based on User Terminal Events," to Apple Inc., Aug. 26, 2011.
"International Search Report and Written Opinion of the International Search Authority mailed Jun. 19, 2009", for International Application No. PCT/EP 2008/056069, Jun. 19, 2009.
"International Search Report and Written Opinion of the International Searching Authority mailed Feb. 11, 2009, issued by the International Searching Authority", in related International Application PCT/EP 2008/063839 (11 pages).
"International Search Report mailed Mar. 24, 2009", in related PCT International Application No. PCT/EP 2008/063326 (4 pages), Mar. 24, 2009.
"Notice of Allowance dated Apr. 29, 2011", U.S. Appl. No. 11/888,680, Apr. 29, 2011, 13 pages.
"Office Action dated Mar. 31, 2011 issue by the U.S. Patent Office", in related U.S. Appl. No. 12/080,124 (29 pages), Mar. 31, 2011.
"Office Action issued from the USPTO dated Aug. 20, 2009", issued in related U.S. Appl. No. 12/075,593 (14 pages), Aug. 20, 2009.
"Office Action issued Mar. 17, 2010", in related U.S. Appl. No. 12/075,593 (11 pages), Mar. 17, 2010.
"Office Action Issued Oct. 15, 2010 by the U.S. Patent Office", in related U.S. Appl. No. 12/080,124 (28 pages), Oct. 15, 2010.
"Search Report under Section 17 dated Jul. 7, 2008", in related U.K. Application GB 0803273.2.
"U.K. Search Report under Section 17 dated Oct. 23, 2007", in U.K. Application No. 0712280.7, Oct. 23, 2007.
"Written Opinion of the International Searching Authority mailed Mar. 24, 2009 issued from the International Searching Authority", in related PCT International Application No. PCT/EP 2008/063326 (5 pages), Mar. 24, 2009.
"XP002456252—Statement in Accordance with the Notice from the European Patent Office dated Oct. 1, 2007", concerning business methods (OJ Nov. 2007; p. 592-593), Nov. 1, 2007, 592-593.
Hillard, Dustin et al., "Improving Ad Relevance in Sponsored Search", Proceedings of the third ACM international conference on Web search and data mining, WSDN'10, Feb. 4-6, 2010, Session: Ads, pp. 361-369, ACM, New York, New York, USA, 2010., Feb. 4, 2010, 361-369.
Internet Reference, "Specific Media Behavioral Targeting Index", Specific Media, Inc., Irvine, CA, 2010, Available online at http://www.specificmedia.com/behavioral-targeting.php.
Langheinrich, Marc et al., "Unintrusive Customization Techniques For Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.
Mueller, Milton , "Telecommunication Access in Age of Electronic Commerce: Toward a Third-Generation Service Policy", Nov. 1996, HeinOnline, 49. Fed. Comm L.J., Nov. 1, 1996, 655-665.
Perkins, Ed , "When to buy airfare", http://www.smartertrael.com/travel-advice/when-to-buy-airfare.html?id=1628038, Nov. 21, 2006 (4 pages), Nov. 21, 2006.
Regelson, Moira et al., "Predicting Click-Through Rate Using Keyword Clusters", Proceedings of the Second Workshop on Sponsored Search Auctions, EC'06, SSA2, Jun. 11, 2006, ACM, 2006., Jun. 11, 2006.
Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529, ACM, 2007., May 8, 2007, 521-529.
Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010)., Jul. 29, 2009.

* cited by examiner

METHOD AND DEVICE FOR MANAGING SUBSCRIBER CONNECTION

CROSS-REFERENCE TO RELATED APPLICATIONS

The present application claims the benefit of priority to International Patent Application No. PCT/FI2006/050466 filed 27 Oct. 2006, the contents of which are hereby incorporated by reference in their entirety.

FIELD

The invention relates to a method for managing a subscriber connection and a device for managing a subscriber connection.

BACKGROUND

Mobile marketing and advertising are considered as a channel to reach consumers by utilizing assets and characteristics of mobile media, namely individuality and attainability. Today's mobile marketing is mostly based on push campaigns or pull campaigns that acquire consumers' mobile phone numbers.

An example of a push campaign is a short message service (SMS) campaign where an advertisement is sent to a group of consumers using SMS.

An example of a pull campaign is a "text-to-win" campaign, wherein an article contains a code which a consumer may send to a telephone number used for the campaign and, as a return, he or she receives a notification of a possible price. Furthermore, the consumer receives marketing messages.

Prior art advertising sponsored subscriber connections oblige the subscriber first to receive advertisements, after which free connection time is granted. This is carried out to prevent subscribers from first using free connection time and then terminating the usage of the connection and never receiving advertisements.

A problem is that the prior art method is not a client-friendly approach to a target group of an advertiser. Subscribers may experience this kind of advertising too restrictive and compulsive which does not create a positive attitude to advertisements and to the commodities they advertise.

BRIEF DESCRIPTION OF THE INVENTION

According to an aspect of the invention, there is provided a method for managing a subscriber connection, the method comprising: granting connection services to the subscriber connection; monitoring reception behaviour concerning predetermined messages conveyed to the subscriber connection; and controlling a further connection service grant to the subscriber connection based on the reception behaviour.

According to another aspect of the invention, there is provided a device for managing a subscriber connection, the device comprising means for granting connection services to the subscriber connection; means for monitoring reception behaviour concerning predetermined messages conveyed to the subscriber connection; and means for controlling a further connection service grant to the subscriber connection based on the reception behaviour.

The invention provides several advantages.

In an embodiment of the invention, a free or discounted service is granted typically for a predetermined period of time and the behaviour of a subscriber is monitored. If he or she has not received and/or reacted to messages in a predetermined way during the period, he or she is no longer granted a free or discounted service. This approach is a client-friendly way of mobile marketing simultaneously minimizing the economical risk involved in messages left unread.

LIST OF DRAWINGS

In the following, the invention will be described in greater detail with reference to embodiments and the accompanying drawings, in which FIG. 1 shows an example of a communications network;

DESCRIPTION OF EMBODIMENTS

Delivering advertisements according to embodiments of the invention is typically carried out in a communications network. Some examples of the communications networks are a Universal Mobile Telecommunications System (UMTS) radio access network (UTRAN), Global System for Mobile Communications (GSM) and its modifications, Wireless Local Area Network (WLAN), Worldwide Interoperability for Microwave Access (WiMAX), Bluetooth®, Personal Communications Services (PCS) and systems using ultra-wideband (UWB) technology.

Figure 1:
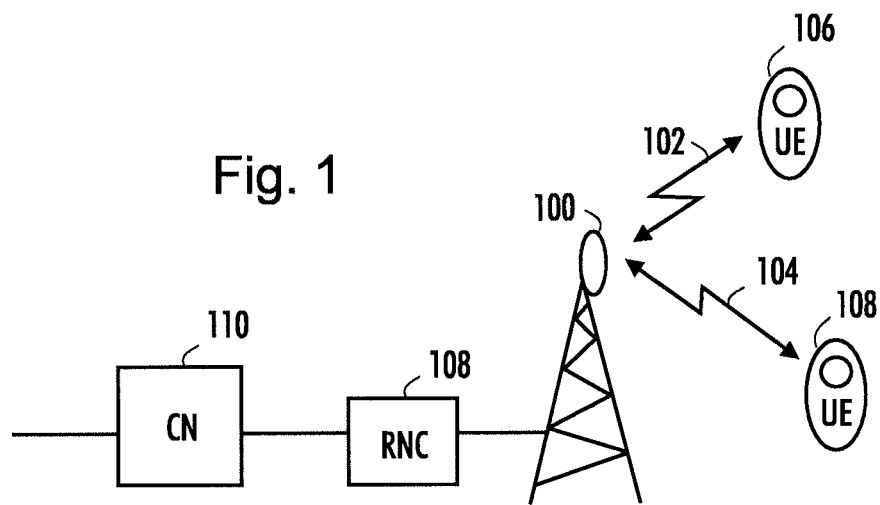

A variety of message types can be used in embodiments of the invention: the messages may be Short Message Service (SMS) messages, multimedia messages (such as Multimedia Messaging Services (MMS) messages), Wireless Application Protocol (WAP) messages, WAP-push messages, messages in a broadcasting format (examples of such formats are Digital Video Broadcasting for Handheld devices (DVB-H), Integrated Services Digital Broadcasting (ISDB), Digital Audio Broadcasting (DAB)) and messages conveyed via the Internet, etc. FIG. 1 is a simplified illustration of a system to which embodiments according to the invention are applicable. The system of FIG. 1 is presented as a clarifying example. It is obvious to a person skilled in the art that the embodiments of the invention may be applied to different kinds of systems. FIG. 1 shows a part of a WCDMA (Wide Band Code Division Multiple Access) communications network. The WCDMA network is taken herein as an example of a communications network providing mobility.

The WCDMA communications network is a cellular radio system which comprises a base station 100, which has bi-directional radio links 102, 104 to user devices 106, 108. A user device may be a mobile phone, a laptop or a multimedia device, for instance.

Figure 2:
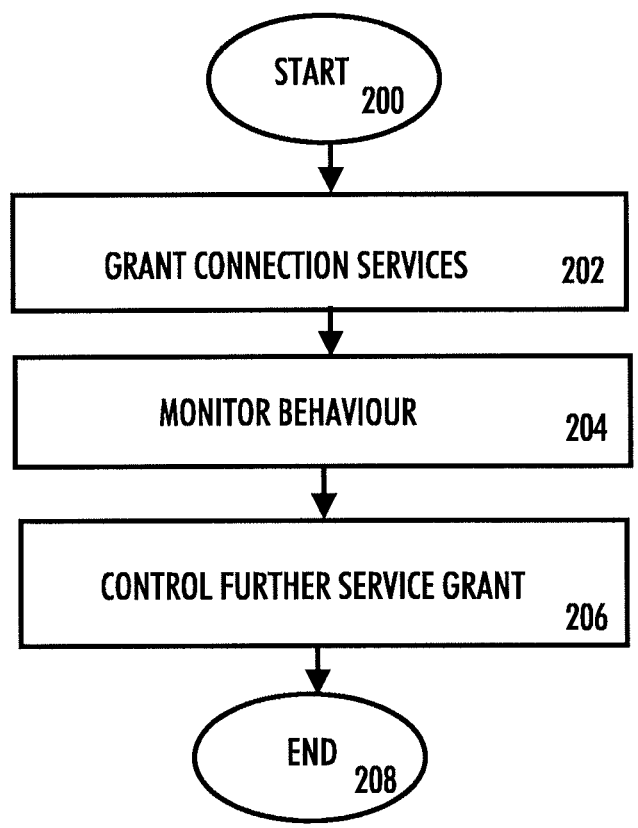
FIG. 2 is a flow chart.

The base station is connected to a radio network controller (or node B) 108 which, in turn, has a connection to a core network 110. Equipment needed for advertising, such as a billing system and delivery management may be placed in the core network. In the following, and embodiment of a method for managing a subscriber connection is explained in further detail by means of FIG. 2. The embodiment starts in block 200.

It should be noticed that in this application, free in relation to connection services, etc. means in addition to free, also discounted or subsidized prices for some or all connection services.

In block 202, connection services are granted to a subscriber connection.

Typically, a subscriber obtains free or discounted connection time, such as talk time, and/or a right to send free messages, such as short message service (SMS) messages, data connection usage of a certain amount of data for such generic data services like the Internet or electronic mail, free content services such as videos, television contents, music, applications, games, WAP pages, Internet pages, ringing tones, wall papers, etc. The service provider, i.e. a party who offers mobile marketing or other similar kind of messaging services, typically uses a prepaid system of a communications network which is used for message delivery. Prepaid systems are known in the prior art and they are not explained herein. The method is simultaneously operable in a plurality of communications network, in which case one billing system is typically selected for use.

A connection service grant may be talk time, 20 minutes for instance, free of charge or at a discounted price. Talk time may also be used for data delivery. It is also possible to grant a quota of talk time and a number of free messages to be delivered for instance in domestic communications networks.

In block 204, reception behaviour concerning predetermined messages conveyed in the subscriber connection is monitored.

The messages are typically marketing messages, such as different kinds of advertisements.

The monitoring of the receiving behaviour may be carried out in many ways, such as by monitoring a subscriber's opening, viewing or forwarding of messages, answering queries or completing a predetermined task, such as collecting product codes and forwarding them to the message delivery system or to the advertiser.

Usually, an advertiser orders a marketing campaign, where advertisements are delivered to consumers' user devices, such as mobile phones or multimedia devices. An advertiser may be a person, a group of persons, a company, a civil service department, etc.

Campaign material (including texts, images, sounds videos, hypertext markup language (html), tags, links, etc.) is typically designed by an advertising agency. The advertising campaign material may be a multimedia message, a video, a text message, etc. The advertiser typically defines a target group for the campaign.

Once a subscriber performs a predetermined action, such as opening an advertisement, the action is monitored. Information on such a performance can be obtained from a subscriber terminal, communications network infrastructure, from a shop where a coupon has been used or from some other sources. The information on the performance typically includes a subscriber identity code and an advertisement identity code in order to identify both the subscriber and the marketing message successfully delivered (opened, query answered, etc.). A monitoring period may vary according to current needs. A monitoring period may also be divided into shorter periods.

In block 206, a further connection service grant to the subscriber connection is controlled on the basis of the reception behaviour.

The amount of further connection service grant may vary, depending on for instance the speed of response, type of campaign (a campaign can be valued in such a way that opening messages of this particular campaign produce more talk time than opening messages of another campaign, for example), customer type (key, incidental or new customer, etc.), historical data on the behaviour of a subscriber, the type of response, such as level of subscriber activity (for instance, more free service time for a subscriber who answered all questions asked in an advertisement, less free service time for one who only opened the advertisement), performance of a purchasing event or forwarding a message to other person or group of persons, etc.

The amount of further connection service grant can also depend on how a subscriber has used a previous connection service grant (for consumers who only use, for instance text messaging services, a further connection service grant can include more text messaging services than other services). The type of further connection service grant can depend on a subscriber's response pattern as well. For example, if a subscriber watches sent video advertisements, he or she can be awarded video watching time as a further connection service grant.

Conditions for further service grants are typically determined before an advertisement campaign takes place.

A further service granting is typically carried out periodically or after a predetermined event, such as answering questions presented in an advertisement or using a coupon.

Further service grant may also be called a refill. Additionally, an option exists that a subscriber may be offered some other benefits than a further connection service grant for the receiving behaviour, such as money or monetary value commodities. The embodiment ends in block 208. The embodiment may be repeated in several different ways. Typically, each subscriber is granted an amount of connection services free of charge when a subscriber connection is delivered. Then, depending on the behaviour of the subscriber, he or she may be granted more free connection services. The subscriber connection may also be closed.

Next, an example further clarifying an embodiment of the method for managing a subscriber connection is explained. Numerical examples are depicted only for clarity and they do not limit the scope of protection.

In the example, subscribers have an amount of free services to start with. The subscribers are recompensed for viewing marketing messages every week. A recompense takes place if they have opened the messages.

If the subscriber opens 3 advertisements (marketing messages) a day, a service provider grants him or her 60 minutes of domestic voice calls and 50 domestic SMS messages every month, free of charge. It should be noticed that an embodiment may also provide an option to offer an advertiser information on the course of his marketing campaign. Subscribers may also make inquiries about the situation of their free connection services by using a mobile phone or other appropriate means.

Figure 3:
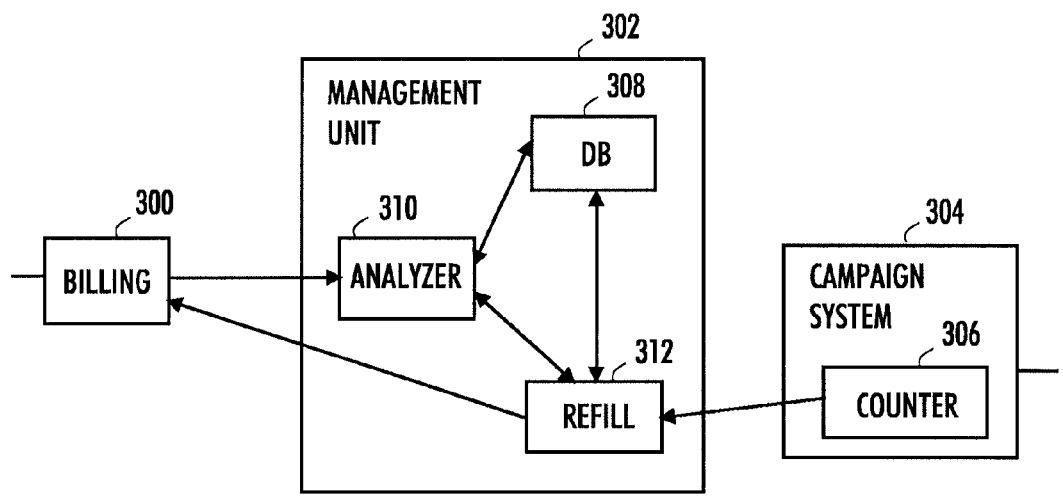
FIG. 3 illustrates an example of an arrangement according to an embodiment of the invention.

FIG. 3 illustrates an example of an arrangement according to an embodiment of the invention.

The arrangement typically uses the same billing system 300 as is used by an operator of a communications network uses for its own billing. The billing may also be carried out in a way used by the operator uses in its billing, for instance subtracting spent money from a pre-paid account. The arrangement further includes a management unit 302 which stores information on subscriber account types, rules for carrying out further connection service granting, status of subscribers' use of connection services, etc.

On the basis of the stored information, the management unit may offer a subscriber information on advertisement delivery time, response status (opened or not, questions answered or not, etc.), the beginning of a monitoring period, time of the next refill, the amount of next refill (for example how much free service time the subscriber earned in the monitoring period and how much he or she inherits from the previous period), etc. The arrangement includes an advertisement campaign system 304 which may deliver advertisement campaign material directly to a cellular infrastructure to be sent to user devices or it conveys the material to another unit for delivery.

The advertisement campaign system also includes an action counter 306 which counts advertisement message actions, such as opened messages, performed by subscribers.

In the following, an example further clarifying an embodiment of the method for managing a subscriber connection and the exemplary arrangement of FIG. 3 are explained. Numerical examples are depicted only for clarity and they do not limit the scope of protection. A new subscriber is granted 100 minutes of free talk time to be used within 28 days. A starting date and an expiry date are stored in a database 308. In order to limit business risk, a scheduled refill is set to be 100 minutes/4=25 minutes. The division parameter is typically stored in the database 308.

The subscriber starts using the granted free talk time, and receives advertisements. When the advertisements are opened, an action counter 306 informs of it to a refill block 312. At the end of a period of 7 days, the refill block grants a refill to the subscriber connection. The size of the refill typically depends on different parameters, such as the number of opened advertisements, level of activity (questions answered or not, commodities bought or not), etc. It should be noticed that in the embodiment, the refill block also carries out the first connection service grant when the subscriber connection is taken into use.

Further, the refill block 312 may inform the billing system 300 on the amount of service connection grant. The billing system may in turn inform the analyzer 310 about the status of a subscriber connection, such as the amount of used services (talk time, sent messages, etc.) and their costs.

Assuming a subscriber only used 10 minutes of the grant in a first monitoring period, for instance a week, the refill combined with free talk time saved from the first week, makes the total free talk time for a second period to be 35 minutes. Another option is that the unused talk time is not transferred to a following monitoring period.

The second monitoring period starts with 35 minutes of free talk time. The subscriber does not open any of the conveyed advertisements and consumes 5 minutes of the free talk time. At the end of the second monitoring period, the refill is 0 minutes. Thus, two options are provided: the system allows the subscriber to use his or her remaining talk time or the talk time for a following monitoring period is diminished.

In this example, the subscriber is allowed to use the remaining 30 minutes of talk time in a third period. The subscriber opens all advertisements conveyed to him or her and consumes 29 minutes of the talk time. Hence, a refill for a fourth period is 25 minutes.

The fourth period begins with 26 minutes of talk time. The subscriber consumes 23 minutes and opens half of the advertisements conveyed to him or her.

A fifth period begins. On the basis of a business agreement made with the subscriber and historical data on his or her advertisement receiving behaviour during the monitoring period of 28 days and maybe also earlier collected data the subscriber is either granted talk time of full 25 minutes or, since he or she did not open the advertisements conveyed to him or her last week, only a part of it, for instance 12.5 minutes for the second period. The unused talk time could also be transferred to the following period.

As can be seen, a longer monitoring period may be divided into shorter monitoring periods, or there could be only one longer monitoring period.

Account information is readable in an analyzer 310. The analyzer calculates the size of a refill on the basis of used talk time, for instance. The analyzer may also be used to cancel unused talk time, to grant extra refills, etc. Additionally, the analyzer may be used for weighting advertisements differently, thus enabling adjustment of the size of refills.

The system is also usable for providing video services or games for subscribers in a similar manner. In the case of games, the system may provide a higher level or an improved version of a game as a recompense for receiving behaviour.

Figure 4:
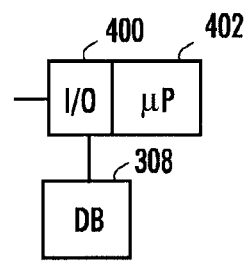
FIG. 4 illustrates an example of a management unit.

FIG. 4 illustrates an example of a management unit. The management unit is typically a server which may include input/output interfaces 400 to receive and transmit information. The server typically also includes or is connected to a database 308. The core of the server is usually a microprocessor 402. In the exemplary management unit, the functionality of an analyzer and a refill block may be integrated into a same microprocessor or they may be separate processors. A subscriber or a third party may also use the input/output interfaces of the management unit to convey information on a granted service balance, i.e. how much of a service grant the subscriber has used and how much he or she has left thereof. Further, the subscriber may be offered statistical information on his receiving behaviour and its influence on further connection service grants.

Embodiments of the method for managing a subscriber connection may be implemented by using a computer program. The program may grant connection services to the subscriber connection, monitor receiving behaviour concerning messages conveyed to the subscriber connection and control further connection service grant to the subscriber connection on the basis of the receiving behaviour.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A computer implemented method comprising:
 initially providing, by a processor, subsidized connection services to a subscriber, the connection services being a connection service type selected from a group consisting of talk time, messages, data connection usage of certain amount of data, free content services, television content, videos, music, applications, games, wireless application protocols pages, internet pages, ring tones, and wall papers;
 sending, by the processor, at least a first advertising message and a second advertising message to the subscriber during a monitoring period in which the subscriber is making use of the subsidized connection services, wherein the first advertising message is in a first messaging format and the second advertising message is in a second messaging format, different than the first messaging format;

analyzing, by the processor, during the monitoring period, reception behavior of the subscriber with respect to the first advertising message and the second advertising message to result in an analysis, wherein reception behavior is based on the subscriber performing predetermined actions in relation to the first advertising message and the second advertising message;

determining, by the processor, based on the analysis, that the subscriber adequately performed predetermined actions in relation to the first advertising message; and granting, by the processor, additional subsidized connection services based on the analysis, wherein the connection service type of the additional subsidized connection services is selected based on the first messaging format.

2. The computer implemented method of claim 1, wherein the amount of additional subsidized connection services is variable depending on at least one of: speed of response, type of campaign, type of response, type of customer, historical data on the reception behavior of a subscriber, type of message, completeness of response, performance of a purchasing event and a forwarding a message.

3. The computer implemented method of claim 1, wherein conditions for granting additional subscriber connections are determined before an advertisement campaign takes place.

4. The computer implemented method of claim 1, wherein the predetermined actions include at least one of: opening, viewing or forwarding messages, answering queries, purchasing an item, clicking on an advertisement, or completing a predetermined task.

5. The computer implemented method of claim 1, wherein the connection service type of additional subsidized connection services depends on how a subscriber has used previous subsidized connection services.

6. The computer implemented method of claim 1, wherein analyzing reception behavior is based on a use of subscriber identity codes and marketing identity codes, when both the subscriber and a message successfully delivered are identifiable.

7. The computer implemented method of claim 1, wherein the first advertising message and the second advertising message have no effect on the initially provided subsidized connection services.

8. A system comprising:
a processor; and
a memory containing instruction that, when executed, cause the processor to:
   initially provide subsidized connection services to a subscriber, the connection services being a connection service type selected from a group consisting of talk time, messages, data connection usage of certain amount of data, free content services, television content, videos, music, applications, games, wireless application protocols pages, internet pages, ring tones, and wall papers;

send at least a first message and a second message to the subscriber during a monitoring period in which the subscriber is making use of the subsidized connection services, wherein the first advertising message is in a first messaging format and the second advertising message is in a second messaging format, different than the first messaging format;

analyze, during the monitoring period, reception behavior of the subscriber with respect to the first advertising message and the second advertising message to result in an analysis, and grant additional subsidized connection services based on the analysis, wherein reception behavior is based on the subscriber performing predetermined actions in relation to the first advertising message and the second advertising message;

determine, based on the analysis, that the subscriber adequately preformed predetermined actions in relation to the first advertising message; and grant additional subsidized connection services based on the analysis, wherein the connection service type of the additional subsidized connection services is selected based on the first messaging format.

9. The system of claim 8, wherein the amount of additional subsidized connection services is variable depending on at least one of: speed of response, type of campaign, type of response, type of customer, historical data on the reception behavior of a subscriber, type of message, completeness of response, performance of a purchasing event and forwarding a message.

10. The system of claim 8, wherein conditions for granting additional subscriber connections are determined before an advertisement campaign takes place.

11. The system of claim 8, wherein the predetermined actions include at least one of: opening, viewing or forwarding messages, answering queries, purchasing an item, clicking on an advertisement, or completing a predetermined task.

12. The system of claim 8, wherein the connection service type of additional subsidized connection services depends on how a subscriber has used previous subsidized connection services.

13. The system of claim 8, wherein analyzing reception behavior is based on a use of subscriber identity codes and marketing identity codes, when both the subscriber and a message successfully delivered are identifiable.

14. The system of claim 8, wherein the first advertising message and the second advertising message have no effect on the initially provided subsidized connection services.

* * * * *